(12) United States Patent
Rofougaran et al.

(10) Patent No.: US 8,260,360 B2
(45) Date of Patent: *Sep. 4, 2012

(54) TRANSCEIVER WITH SELECTIVE BEAMFORMING ANTENNA ARRAY

(75) Inventors: Ahmadreza Reza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 903 days.

This patent is subject to a terminal disclaimer.

(21) Appl. No.: 11/821,382

(22) Filed: Jun. 22, 2007

(65) Prior Publication Data

US 2008/0318632 A1    Dec. 25, 2008

(51) Int. Cl.
*H04M 1/00* (2006.01)

(52) U.S. Cl. ............. 455/562.1; 455/100; 455/103; 455/434; 455/561; 370/252; 370/329; 370/336; 370/338; 370/348; 375/267

(58) Field of Classification Search ............ 455/102, 455/103, 104, 39, 500, 526, 78, 79, 80, 82, 455/83, 550.1, 552.1, 553.1, 562.1, 575.1, 455/101, 434, 561; 375/267; 370/252, 329, 370/336, 338, 348
See application file for complete search history.

(56) References Cited

U.S. PATENT DOCUMENTS

| | | | | |
|---|---|---|---|---|
| 7,190,974 | B2* | 3/2007 | Efland et al. | 455/562.1 |
| 7,586,989 | B2* | 9/2009 | Tsai et al. | 375/260 |
| 7,773,956 | B2* | 8/2010 | Fukamachi et al. | 455/78 |
| 2004/0259597 | A1* | 12/2004 | Gothard et al. | 455/562.1 |
| 2006/0025171 | A1* | 2/2006 | Ly et al. | 455/553.1 |
| 2006/0105767 | A1* | 5/2006 | Kim | 455/434 |
| 2006/0182017 | A1* | 8/2006 | Hansen et al. | 370/208 |
| 2006/0239372 | A1* | 10/2006 | Kim | 375/267 |
| 2007/0008946 | A1* | 1/2007 | Kim | 370/345 |
| 2008/0181180 | A1* | 7/2008 | Karaoguz | 370/331 |
| 2008/0254752 | A1* | 10/2008 | Oh et al. | 455/83 |

* cited by examiner

*Primary Examiner* — Junpeng Chen
(74) *Attorney, Agent, or Firm* — Garlick & Markison; Holy L. Rudnick

(57) ABSTRACT

A multiple mode RF transmitter a baseband section, a transmitter section, and a configurable antenna circuit. The transmitter section is couple to convert a first outbound symbol stream into first outbound RF beamforming signals in accordance with a first beamforming setting and convert a second outbound symbol stream into second outbound RF beamforming signals in accordance with a second beamforming setting. The configurable antenna circuit is coupled to provide a first antenna assembly for transmitting the first outbound RF beamforming signals and provide a second antenna assembly for transmitting the second outbound RF beamforming signals.

17 Claims, 10 Drawing Sheets

TRANSCEIVER WITH SELECTIVE BEAMFORMING ANTENNA ARRAY

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to antennas used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Since the wireless part of a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, the same polarization, different polarization, and/or any number of other electro-magnetic properties.

One popular antenna structure for RF transceivers is a three-dimensional in-air helix antenna, which resembles an expanded spring. The in-air helix antenna provides a magnetic omni-directional mono pole antenna, but occupies a significant amount of space and its three dimensional aspects cannot be implemented on a planer substrate, such as a printed circuit board (PCB).

For PCB implemented antennas, the antenna has a meandering pattern on one surface of the PCB. Such an antenna consumes a relatively large area of the PCB. For example, a ¼ wavelength antenna at 900 MHz has a total length of approximately 8 centimeters (i.e., 0.25*32 cm, which is the approximate wavelength of a 900 MHz signal). As another example, a ¼ wavelength antenna at 2400 MHz has a total length of approximately 3 cm (i.e., 0.25*12.5 cm, which is the approximate wavelength of a 2400 MH signal). Even with a tight meandering pattern, a single 900 MHz antenna consumes approximately 4 cm$^2$.

If the RF transceiver is a multiple band transceiver (e.g., 900 MHz and 2400 MHz), provides beamforming, provides polarization, provides diversity, and/or provides multiple in-band communications, then two antennas are needed, which consumes even more PCB space. In addition, due to multiple path fading, the received signals have distortion (e.g., amplitude error and/or phase error) with respect to the transmitted signals. There are many solutions to overcome this problem once the received RF signals are converted to baseband, however, there are few, if any, solutions to correct this problem in RF.

Therefore, a need exists for an antenna assembly and applications thereof that overcomes at least some of the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
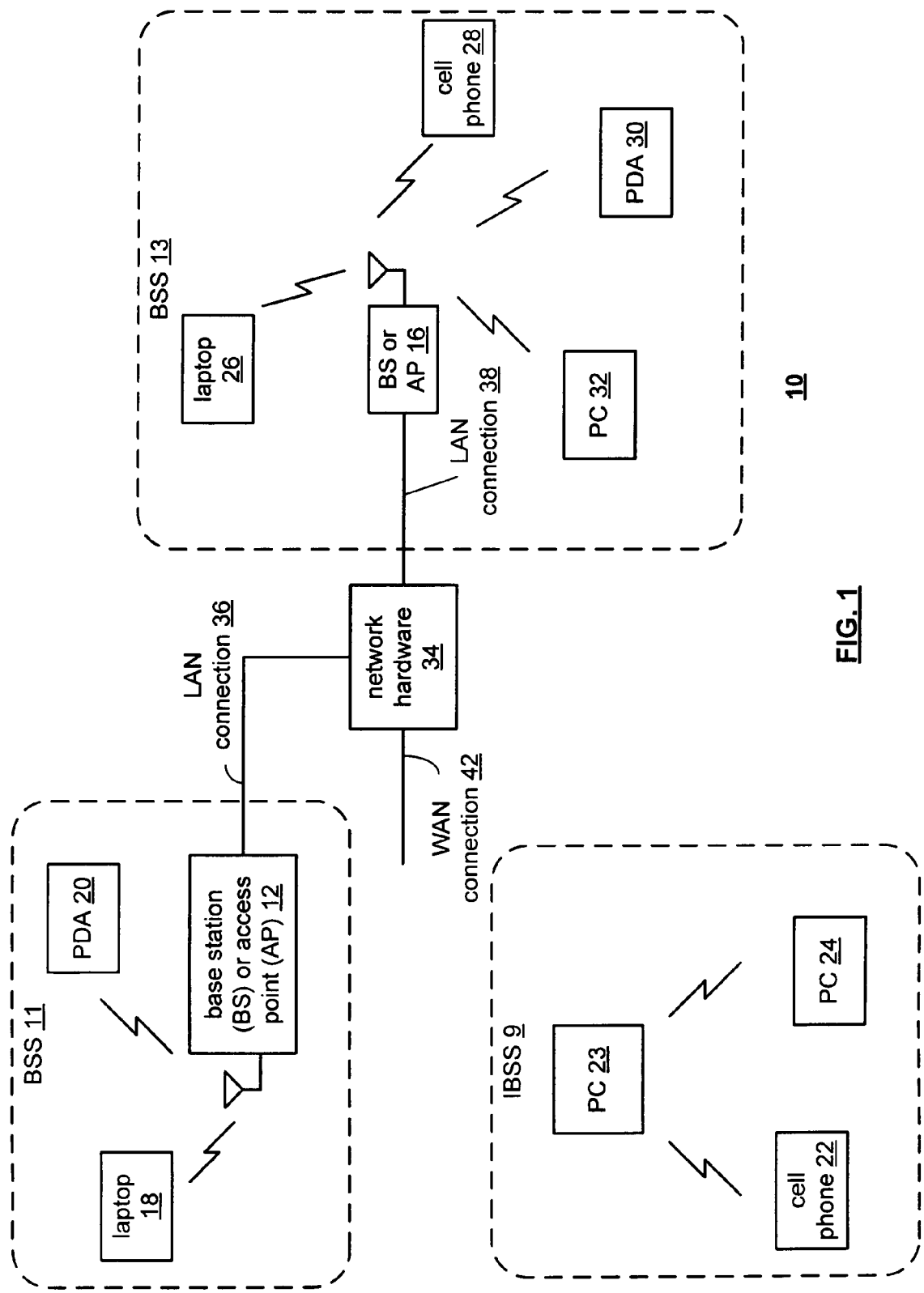
FIG. 1 is a schematic block diagram of an embodiment of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to one or more of FIGS. 2-12.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
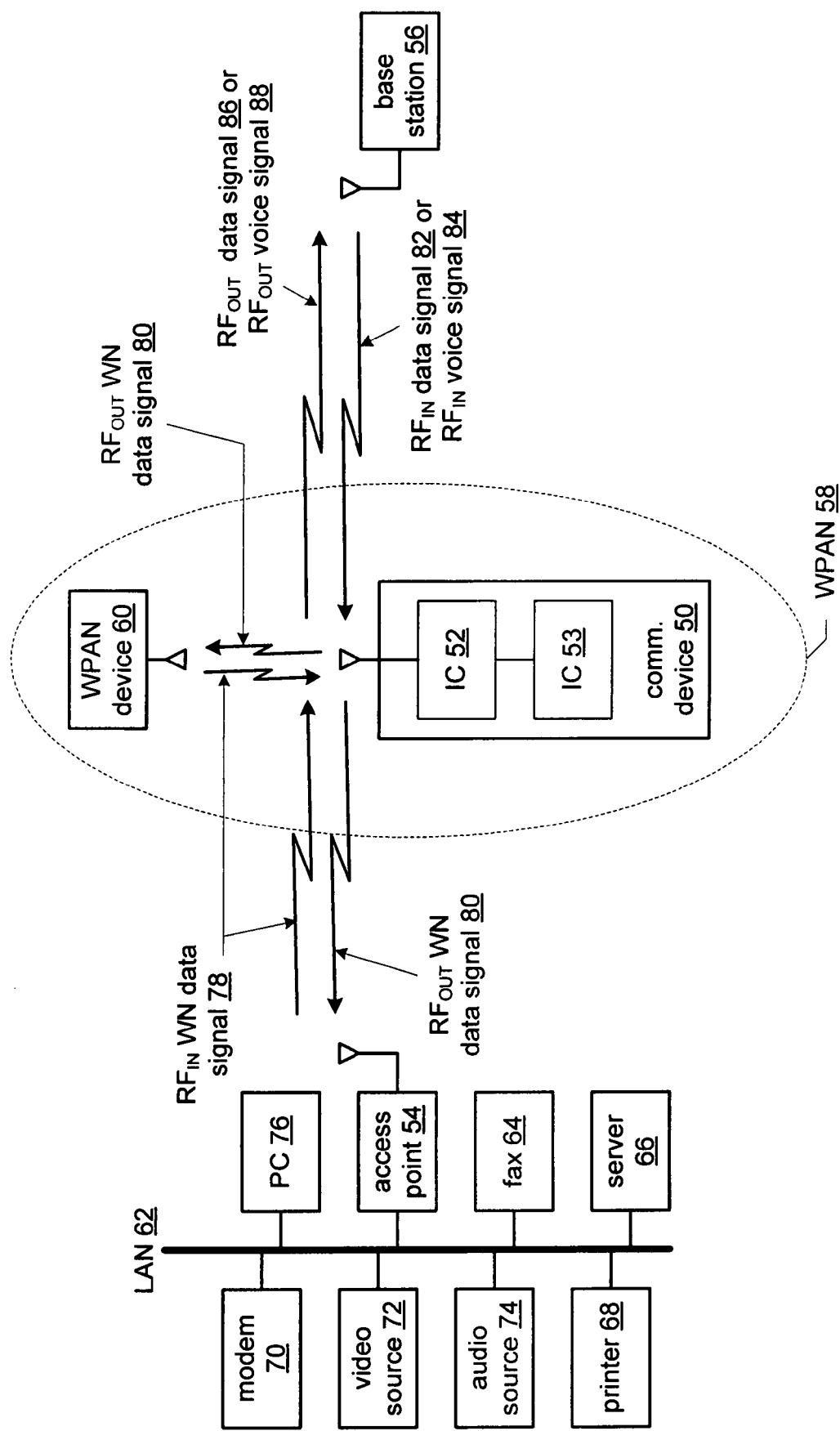
FIG. 2 is a schematic block diagram of an embodiment of a wireless communication device in accordance with the present invention.

FIG. 2 is a schematic block diagram of another embodiment of a wireless communication system that includes a communication device 50 associated with a cellular network, a wireless local area network (WLAN) and/or a wireless personal area network (WPAN) 58. The WLAN network is shown to include an access point 54, a local area network (LAN) bus 62, a modem 70, a video source 72, an audio source 74, a printer 68, a personal computer (PC) 76, a facsimile machine (fax) 64, and a server 66, but may include more or less components than shown. The cellular network is shown to include a base station 56, which may support voice communications and/or data communications. Note that the cellular network may include more components than the base station 56. The WPAN 58 includes at least one WPAN device 60 that is proximal to the communication device 50. Note that the WPAN device 60 may be a Bluetooth headset, a wireless microphone, a wireless speaker, a wireless display, and/or a wireless data entry unit.

In this embodiment, the communication device 50, which may be one of the communication devices 18-32 of FIG. 1 or another type of communication device, includes one or more integrated circuits (IC) 52 and 53 to communication with the cellular network, the WLAN, and/or the WPAN. Such a communication may include voice communications, audio communications, video communications, graphics communications, text communications, and/or data communications (e.g., emails, web browsing, short message services, etc.). For example, the communication device 50 may be receiving an audio file from the audio source 74 (e.g., a computer storing an MP3 file, a radio receiver, a cable set top box, a satellite receiver, a CD player, etc.), the server 66, and/or the PC 76 via the access point 54 as an inbound RF wireless network (WN)

data signal 78. The IC 52 and/or 53 processes the inbound RF WN data signal 78 to produce inbound data that may be rendered audible by speaker circuitry of the IC 52 and/or communication device 50. Alternatively and/or in addition to, the IC 52 and/or 53 may convert the inbound data signal from the WLAN to an outbound RF WN data signal 80 that is provided to the WPAN device 60, which may reproduce the inbound data for presentation (e.g., render it audible).

As another example, the communication device 50 may be receiving a video file from the video source 72 (e.g., a computer storing a video file, a cable set top box, a satellite receiver, a DVDD player, etc.), the server 66, and/or the PC 76 via the access point 54 as an inbound RF WN data signal 78. The IC 52 and/or 53 processes the inbound RF WN data signal 78 to produce inbound data that may be presented on a display (e.g., speakers and LCD, DLP, or plasma display panel) of the communication device 50. Alternatively and/or in addition to, the IC 52 may convert the inbound data signal from the WLAN to an outbound RF WN data signal 80 that is provided to the WPAN device 60, which may reproduce the inbound data for presentation (e.g., play the video file).

As yet another example, the communication device 50 may record video, voice, and/or audio to produce a recorded file. In this example, the IC 52 and/or 53 may convert the recorded file into an outbound RF WN data signal 80 that is provided to the WLAN. The access point 54 recovers the recorded file and provides it to one of the other devices (e.g., PC 76, server 66, modem 70) for storage and/or forwarding onto the Internet.

As a further example, the modem 70, the PC 76, the server 66, the fax 64, and/or the printer 68 may provide a file to the access point 54 for communication to the communication device 50. In this instance, the access point 54 converts the file into the inbound WN data signal 78. The IC 52 and/or 53 processes the received the inbound WN data signal 78 to recapture the file, which may be presented on the communication device 50 and/or provided to the WPAN device 60.

As yet a further example, the communication device 50 may have a graphics, text, and/or a data file for communication to a component of the WLAN. In this example, the IC 52 and/or 53 converts the graphics, text, and/or data file into the outbound RF WN data signal 80 that is provided to the access point 54 and/or to the WPAN 60. In one embodiment, the access point 54 recovers the graphics, text, and/or data file and provides it to the PC 76, the modem 70, the fax 64, the printer 68, and/or the server 66. Note that the file may include an address that identifies which component(s) of the WLAN are to receive the file.

More examples include voice and/or data communications between the communication device 50 and the base station 56 in accordance with one or more cellular communication standards, which includes, but is not limited to, past, present, and/or future versions of GSM, CDMA, wideband CDMA (WCDMA), EDGE, GPRS, AMPS, and digital AMPS. For instance, the IC 52 and/or 53 may process outbound voice signals to produce outbound RF voice signals 88 and process inbound RF voice signals 84 to produce inbound voice signals. The IC 52 and/or 53 may facilitate the presentation of the inbound and outbound voice signals on the communication device 50 and/or transceive them with the WPAN device 60 as the inbound and outbound WN data signals 78 and 80. Further the IC 52 and/or 53 may process outbound data signals to produce outbound RF data signals 86 and process inbound RF data signals 82 to produce inbound data signals. The IC 52 and/or 53 may facilitate the presentation of the inbound and outbound data signals on the communication device 50 and/or transceive them with the WPAN device 60 as the inbound and outbound WN data signals 78 and 80.

Figure 3:
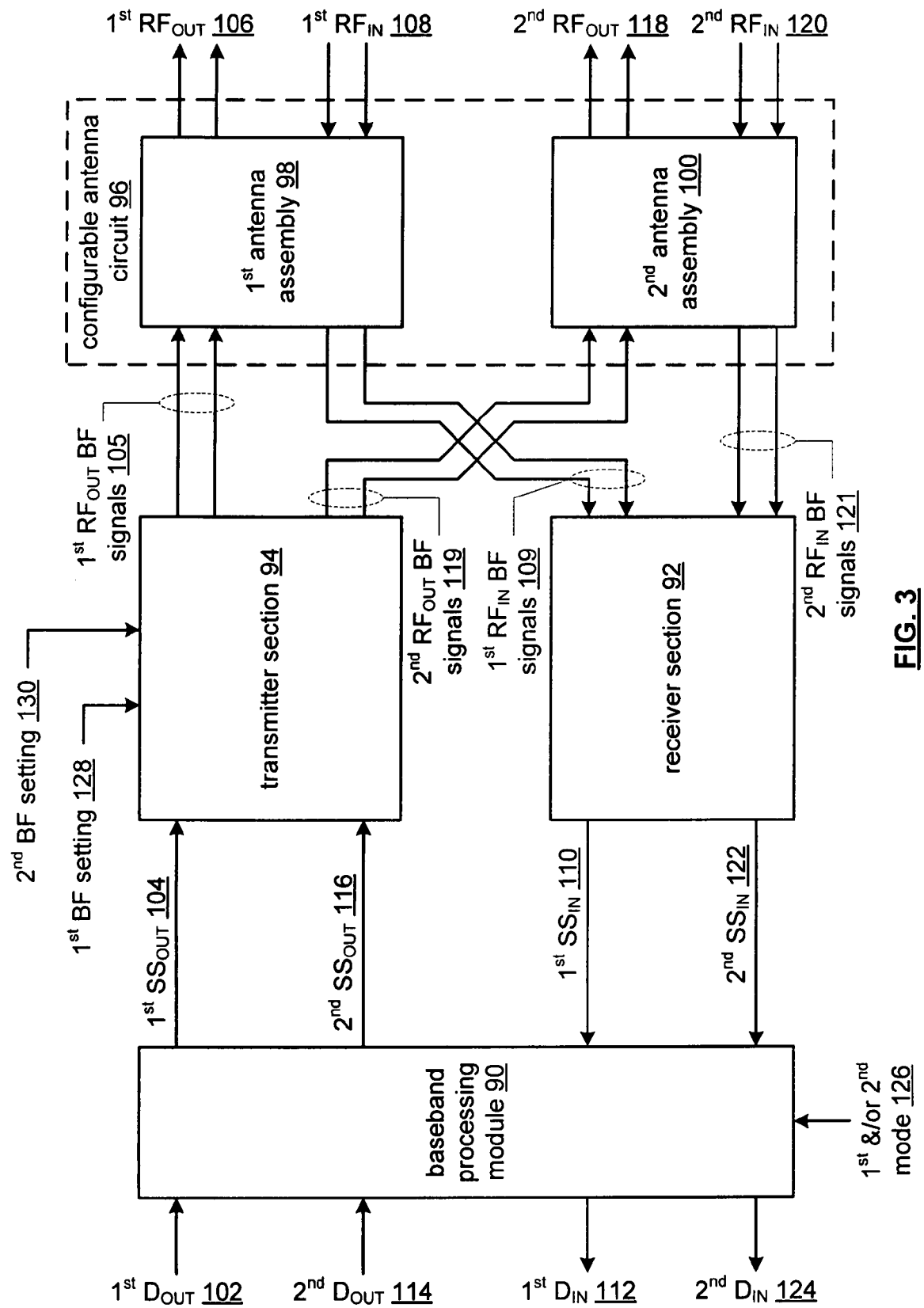
FIG. 3 is a schematic block diagram of another embodiment of a wireless communication device in accordance with the present invention.

FIG. 3 is a schematic block diagram of another embodiment of a wireless communication device that includes a baseband processing module 90, a receiver section 92, a transmitter section 94, and a configurable antenna circuit 96. In an embodiment, the configurable antenna circuit 96 is configured to provide first and second antenna assemblies 98 and 100. Note that the baseband processing module 90, the receiver section 92, the transmitter section 94, and at least part of the configurable antenna circuit 96 may be implemented on one or more of the ICs 52 and 53.

The baseband processing module 90 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 3-12.

In operation, the baseband processing module 90 converts $1^{st}$ outbound data 102 (e.g., voice, text messages, audio files, video files, image files, graphics, etc.) into one or more outbound symbol streams 104 in accordance with one or more wireless communication protocols (e.g., past, present, and/or future versions of GSM, CDMA, wideband CDMA (WCDMA), EDGE, GPRS, AMPS, digital AMPS, IEEE 802.11, Bluetooth, ZigBee, and/or any other type of wireless network protocol) in a first mode 126. In addition, the baseband processing module 90 converts $2^{nd}$ outbound data 114 into one or more $2^{nd}$ outbound symbol streams 116 in accordance with another one or more of the wireless communication protocols in a second mode 126, which may be active concurrently with the first mode or active separately with respect to the first mode. The outbound symbol streams 112 and 116 may include in-phase and quadrature components, phase modulation components, amplitude modulation components, and/or frequency modulation components based one more of more modulation schemes including, but not limited to, BPSK (binary phase shift keying), QPSK (quadrature phase shift keying), MSK (minimum shift keying) GMSK (Gaussian MSK), FSK (frequency shift keying), GFSK (Gaussian FSK), AM (amplitude modulation), FM (frequency modulation), ASK (amplitude shift keying), and QAM (quadrature amplitude modulation).

The transmitter section 94, embodiments of which will be described in greater detail with reference to FIGS. 4-12, converts the first outbound symbol stream 104 into first outbound RF beamforming signals 105 in accordance with a first beamforming setting 128. In addition to, or in the alternative, the transmitter section 94 converts the second outbound symbol stream 116 into second outbound RF beamforming signals 119 in accordance with a second beamforming setting 130. The baseband processing module 90 may generate the first beamforming setting 128 such that each of the 1$^{st}$ outbound RF signals 105 have a desired beamforming phase offset and may generate the second beamforming setting 130 such that each of the 2$^{nd}$ outbound RF signals 119 have a desired beamforming phase offset.

The first antenna assembly 98 transmits the first outbound RF beamforming signals 105, which are combined in air to produce the first outbound RF signal 106. The second antenna assembly 100 transmits the second outbound RF beamforming signals 119, which are combined in air to produce the second outbound RF signal 118.

The first antenna assembly 98 may also receive a first inbound RF signal 108 and generate, therefrom, a first plurality of inbound RF beamformed signals 109. The receiver section 92 converts the first plurality of inbound RF beamformed signals 109 into a first inbound symbol stream 110. The baseband processing module 90 converts the first inbound symbol stream 110 into first inbound data 112 when in the first mode 126 and in accordance with the one or more of the wireless communication protocols.

The second antenna assembly 100 may also receive a second inbound RF signal 120 and generate, therefrom, a second plurality of inbound RF beamformed signals 121. The receiver section 92 converts the second plurality of inbound RF beamformed signals 121 into a second inbound symbol stream 122. The baseband processing module 90 converts the second inbound symbol stream 122 into second inbound data 124 when in the second mode 126 and in accordance with the other one or more of the wireless communication protocols.

Figure 4:
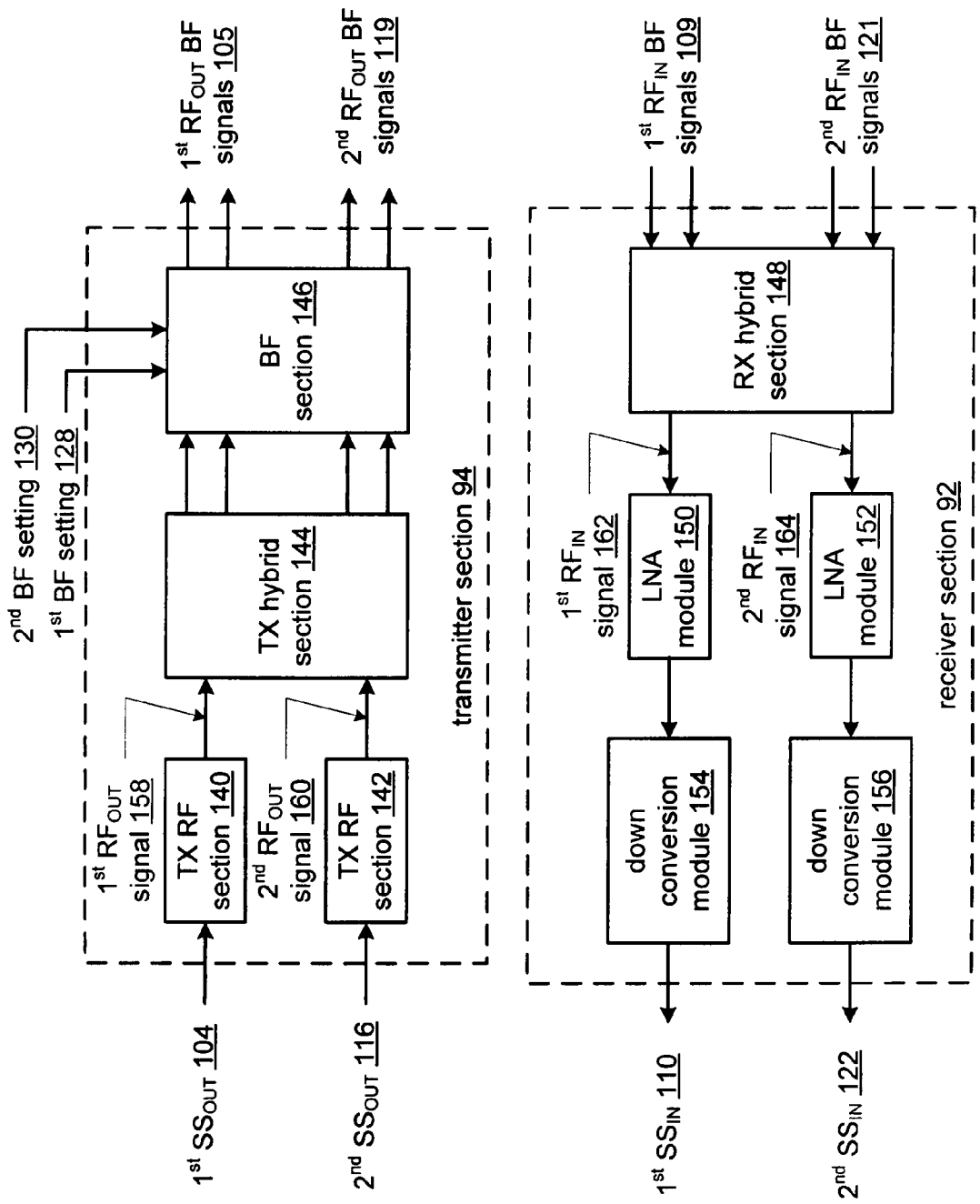
FIG. 4 is a schematic block diagram of an embodiment of a transmitter section and a receiver section in accordance with the present invention.

FIG. 4 is a schematic block diagram of an embodiment of a transmitter section 94 and a receiver section 92. The receiver section 92 includes a receive (RX) hybrid section 148, a plurality of low noise amplifier modules 150-152, and a plurality of down conversion modules 154-156. The transmitter section 94 includes a plurality of transmit (TX) RF sections 140-142, a transmit hybrid section 144, and a beamforming (BF) section 146.

A first TX RF section 140 converts the 1$^{st}$ outbound symbol stream 104 into a 1$^{st}$ outbound RF signal 158 [e.g., A(t)cos($\omega_{TX1}$+$\Phi_T$(t)), where A(t) represents the amplitude modulation information (e.g., amplitude of a polar coordinate or A(t)=√(A$_I$(t)$^2$+A$_Q$(t)$^2$) for Cartesian coordinates), $\Phi$ represents the phase modulation information (e.g., phase for polar coordinates or tan$^{-1}$ (A$_Q$/A$_I$) for Cartesian coordinates]. The TX hybrid section 144 converts the 1$^{st}$ outbound RF signal 158 into a plurality of orthogonal first outbound RF signals (e.g., A(t)cos($\omega_{TX1}$+$\Phi_T$(t)), A(t)cos($\omega_{TX1}$+$\Phi_T$(t)−90°), A(t)cos($\omega_{TX1}$+$\Phi_T$(t)−180°), etc.). The beamforming section 148 converts the plurality of orthogonal first outbound RF signals into the first plurality of outbound RF beamforming signals 105 in accordance with the first beamforming setting 128 (e.g., A(t)cos($\omega_{TX1}$+$\Phi_T$(t)+θ$_1$) and A(t)cos($\omega_{TX1}$+$\Phi_T$(t)−90°+θ$_2$), where θ corresponds to the beamforming setting 128).

A second TX RF section 142 converts the 2$^{nd}$ outbound symbol stream 116 into a 2$^{nd}$ outbound RF signal 160 [e.g., A(t)cos($\omega_{TX2}$+$\Phi_T$(t)), where A(t) represents the amplitude modulation information (e.g., amplitude of a polar coordinate or A(t)=√(A$_I$(t)$^2$+A$_Q$(t)$^2$) for Cartesian coordinates), $\Phi$ represents the phase modulation information (e.g., phase for polar coordinates or tan$^{-1}$ (A$_Q$/A$_I$) for Cartesian coordinates]. The TX hybrid section 144 converts the 2$^{nd}$ outbound RF signal 160 into a plurality of orthogonal second outbound RF signals (e.g., A(t)cos($\omega_{TX2}$+$\Phi_T$(t)), A(t)cos($\omega_{TX2}$+$\Phi_T$(t)−90°), A(t)cos($\omega_{TX2}$+$\Phi_T$(t)−180°), etc.). The beamforming section 148 converts the plurality of orthogonal second outbound RF signals into the second plurality of outbound RF beamforming signals 119 in accordance with the second beamforming setting 130 (e.g., A(t)cos($\omega_{TX2}$+$\Phi_T$(t)+θ$_1$) and A(t)cos($\omega_{TX2}$+$\Phi_T$(t)−90°+θ$_2$), where θ corresponds to the beamforming setting 130).

Within the receiver section 92, the hybrid section 148 converts the first inbound beamformed RF signals 109 into a first inbound RF signal 162. The first low noise amplifier module 150 amplifies the first inbound RF signal 162 to produce a first amplified inbound RF signal. The first down conversion module 154 converts the first amplified inbound RF signal into the first inbound symbol stream 110.

The hybrid section 148 converts also the second inbound beamformed RF signals 121 into a second inbound RF signal 164. The second low noise amplifier module 152 amplifies the second inbound RF signal to produce a second amplified inbound RF signal. The second down conversion module 156 converts the second amplified inbound RF signal into the second inbound symbol stream 122.

Figure 5:
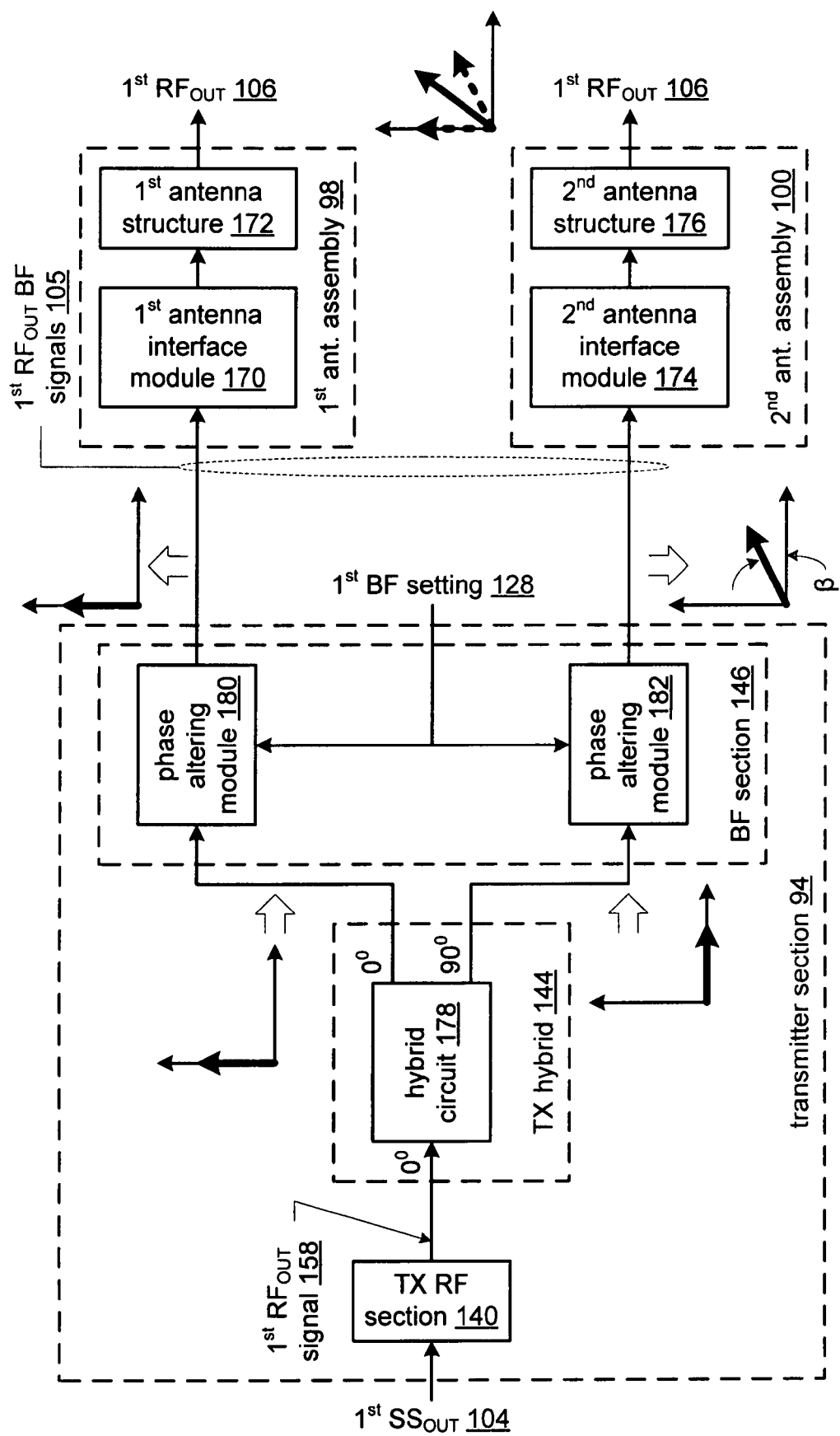
FIG. 5 is a schematic block diagram of an embodiment of a transmitter section coupled to an antenna assembly in accordance with the present invention.

FIG. 5 is a schematic block diagram of an embodiment of a transmitter section 94 when the first mode is active. In this mode, the first TX RF section 140 converts the 1$^{st}$ outbound symbol stream 104 into the first outbound RF signal 158. The hybrid section 144, which includes a hybrid circuit 178, generates a pair of orthogonal outbound RF signals [e.g., A(t)cos ($\omega_{TX1}$+$\Phi_T$(t)) & A(t)cos($\omega_{TX1}$+$\Phi_T$(t)−90°)] as shown.

The beamforming section 146 includes first and second phase altering modules 180 and 182. In this example embodiment, the first phase altering module 180 adds a phase adjust of 0° to produce a first one of the plurality of outbound RF beamforming signals. The second phase altering module 182 adds a beamforming angle of β to produce another one of the plurality of outbound RF beamforming signals [e.g., A(t)cos ($\omega_{TX1}$+$\Phi_T$(t)+β)], where β is based on the beamforming setting 128.

The configurable antenna circuit 96 is configured to provide the first and second antenna assemblies 98 and 100. The first antenna assembly 98 includes a first antenna interface module 170 and a first antenna structure 172. The second antenna assembly 100 includes a second antenna interface module 174 and a second antenna structure 176. Each of the antenna structures 172 and 176 may include one or more dipole antennas, mono pole antennas, diversity antenna pairs, planer helical antennas, meandering trace antennas, and/or any other antennas capable of transceiving RF signals. Each of the antenna interfaces 170 and 174 may include a transformer balun, an impedance matching circuit, and/or a transmission line.

In this example, the first communication protocol is enabled such that the first antenna interface module 170 and the first antenna structure 172 are configured to receive the first inbound beamformed RF signals and to transmit one of the first outbound RF beamforming signals and the second antenna interface module 174 and the second antenna structure 176 are configured to transmit another one of the first outbound RF beamforming signals.

When the second communication protocol is enabled, the second TX RF section 142 converts the 2$^{nd}$ outbound symbol stream 116 into the second outbound RF signal 160. The hybrid section 144, which includes hybrid circuit 178 and/or another hybrid circuit, generates a pair of orthogonal outbound RF signals [e.g., A(t)cos($\omega_{TX1}$+$\Phi_T$(t)) & A(t)cos ($\omega_{TX1}$+$\Phi_T$(t)−90°)] from the 2$^{nd}$ outbound RF signal 160. The beamforming section 146 utilizes the first and second phase altering modules 180 and 182 and/or another pair of phase altering modules to adjust the phase of the pair of orthogonal outbound RF signals.

In this mode, the first antenna interface module 170 and the first antenna structure 172 are configured to receive the second inbound beamformed RF signals and to transmit one of the second outbound RF beamforming signals and the second antenna interface module 174 and the second antenna structure 176 are configured to transmit another one of the second outbound RF beamforming signals. Note that the configurable antenna circuit 96 may be implemented as disclosed in co-pending patent application entitled RF TRANSCEIVER WITH ADJUSTABLE ANTENNA ASSEMBLY, having a Ser. No. 11/801,940, and a filing date of May 11, 2007, which is incorporated herein by reference. Further note that the first and second modes may be active concurrently or separately.

Figure 6:
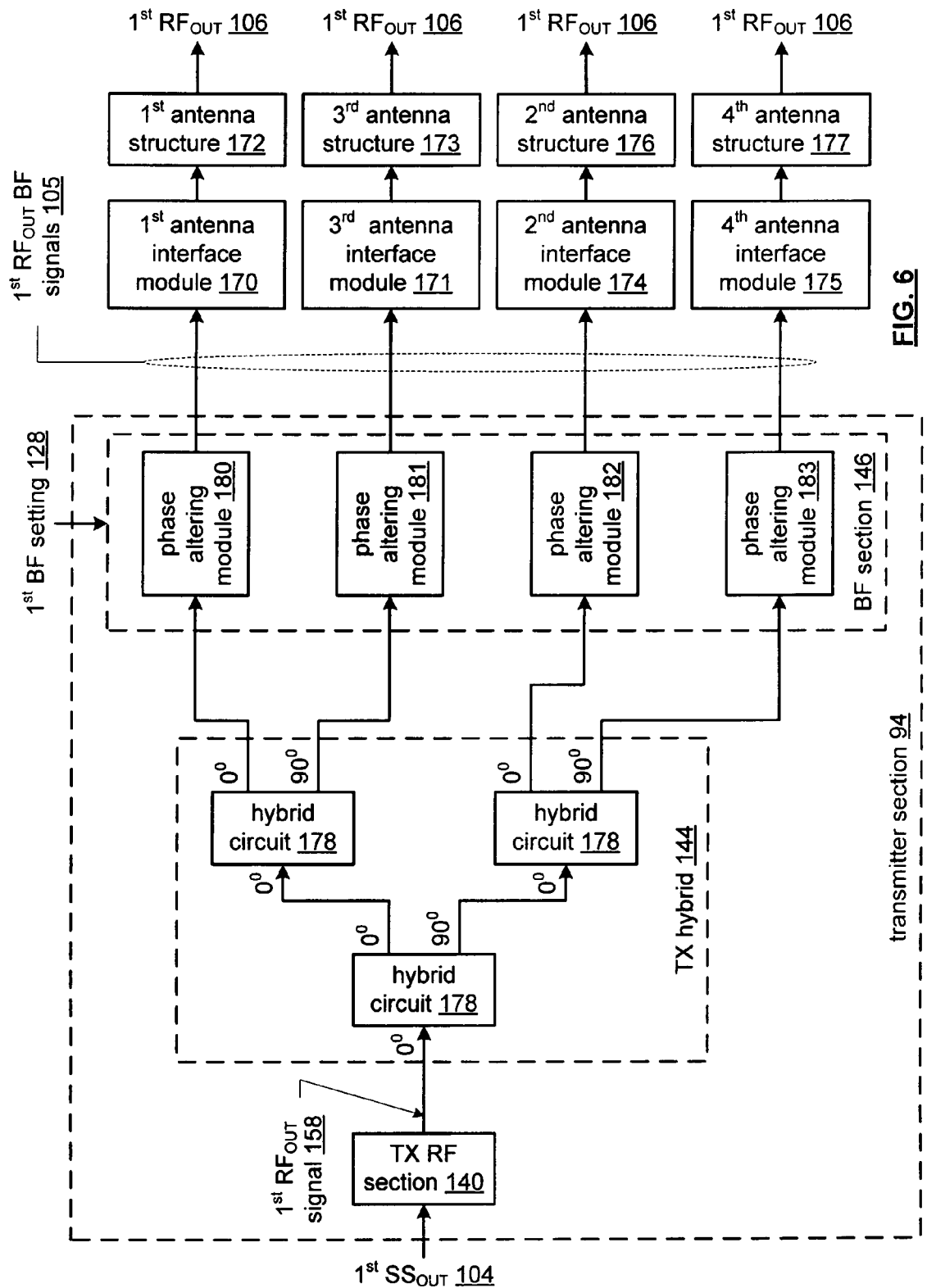
FIG. 6 is a schematic block diagram of another embodiment of a transmitter section coupled to an antenna assembly in accordance with the present invention.

FIG. 6 is a schematic block diagram of another embodiment of a transmitter section 94 when the first mode is active. In this mode, the first TX RF section 140 converts the $1^{st}$ outbound symbol stream 104 into the first outbound RF signal 158. The hybrid section 144, which includes a plurality of hybrid circuits 178, generates four orthogonal outbound RF signals [e.g., $A(t)\cos(\omega_{TX1}+\Phi_T(t))$, $A(t)\cos(\omega_{TX1}+\Phi_T(t)-90°)$, $A(t)\cos(\omega_{TX1}+\Phi_T(t)-180°)$, & $A(t)\cos(\omega_{TX1}+\Phi_T(t)-270°)$].

The beamforming section 146 includes four phase altering modules 180-183 to add a corresponding beamforming angle to their respective outbound RF signals $A(t)\cos(\omega_{TX1}+\Phi_T(t)+\beta_0)$, $A(t)\cos(\omega_{TX1}+\Phi_T(t)-90°+\beta_1)$, $A(t)\cos(\omega_{TX1}+\Phi_T(t)-180°+\beta_2)$, & $A(t)\cos(\omega_{TX1}+\Phi_T(t)-270°+\beta_3)$] where $\beta$ is based on the beamforming setting 128.

The configurable antenna circuit 96 is configured to provide four antenna assemblies, each including an antenna interface module 170, 171, 174, 175 and an antenna structure 172, 173, 176, 177. Each of the antenna structures 172, 173, 176, 177 may include one or more dipole antennas, mono pole antennas, diversity antenna pairs, planer helical antennas, meandering trace antennas, and/or any other antennas capable of transceiving RF signals. Each of the antenna interfaces 170, 171, 174, 175 may include a transformer balun, an impedance matching circuit, and/or a transmission line. In this mode, the antenna assemblies are configured to receive the first inbound beamformed RF signals and to transmit the first outbound RF beamforming signals 106.

When the second communication protocol is enabled, the second TX RF section 142 converts the $2^{nd}$ outbound symbol stream 116 into the second outbound RF signal 160. The hybrid section 144 generates four orthogonal outbound RF signals from the $2^{nd}$ outbound RF signal 160. The beamforming section 146 utilizes the phase altering modules 180-183 and/or other phase altering modules to adjust the phase of the orthogonal outbound RF signals. In this mode, the antenna assemblies are configured to receive the second inbound beamformed RF signals and to transmit the second outbound RF beamforming signals 119.

Figure 7:
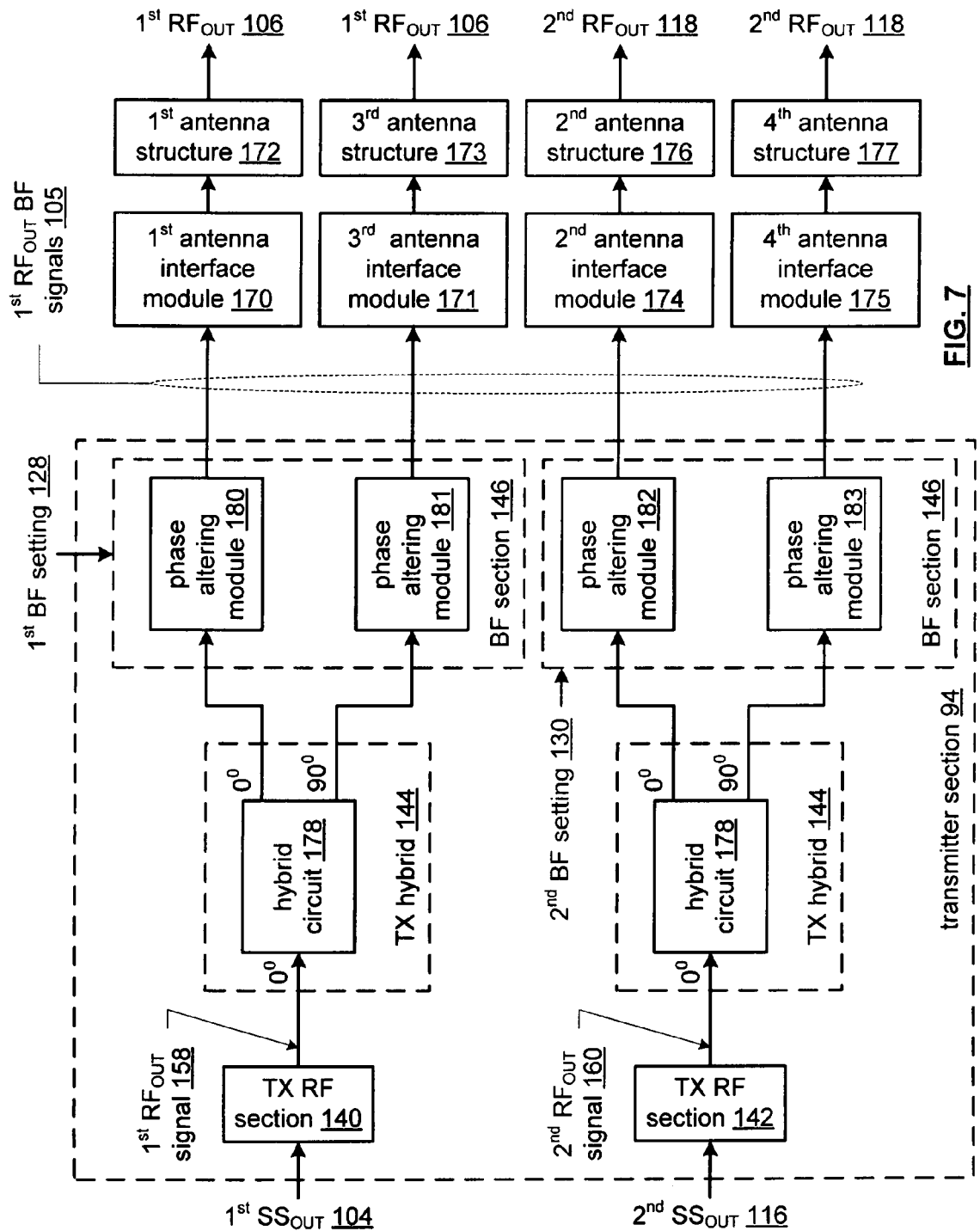
FIG. 7 is a schematic block diagram of another embodiment of a transmitter section coupled to an antenna assembly in accordance with the present invention.

FIG. 7 is a schematic block diagram of another embodiment of a transmitter section 94 when both the first and second modes are active. In this instance, the first TX RF section 140 converts the $1^{st}$ outbound symbol stream 104 into the first outbound RF signal 158. The hybrid section 144, which includes a hybrid circuit 178, generates a pair of orthogonal outbound RF signals [e.g., $A(t)\cos(\omega_{TX1}+\Phi_T(t))$ & $A(t)\cos(\omega_{TX1}+\Phi_T(t)-90°)$]. In addition, the second TX RF section 142 converts the $2^{nd}$ outbound symbol stream 116 into the second outbound RF signal 160. The hybrid section 144, which includes hybrid circuit 178 and/or another hybrid circuit, generates a pair of orthogonal outbound RF signals [e.g., $A(t)\cos(\omega_{TX1}+\Phi_T(t))$ & $A(t)\cos(\omega_{TX1}+\Phi_T(t)-90°)$] from the $2^{nd}$ outbound RF signal 160.

The beamforming section 146 includes first and second phase altering modules 180 and 181. In this example embodiment, the first phase altering module 180 adds a phase adjust of 0° to produce a first one of the plurality of first outbound RF beamforming signals. The second phase altering module 181 adds a beamforming angle of P to produce another one of the plurality of first outbound RF beamforming signals [e.g., $A(t)\cos(\omega_{TX1}+\Phi_T(t)+\beta)$], where $\beta$ is based on the beamforming setting 128. In addition, the beamforming section 146 includes third and fourth phase altering modules 182 and 182. In this example embodiment, the third phase altering module 182 adds a phase adjust of 0° to produce a first one of the plurality of second outbound RF beamforming signals. The fourth phase altering module 183 adds a beamforming angle of $\beta$ to produce another one of the plurality of second outbound RF beamforming signals [e.g., $A(t)\cos(\omega_{TX1}+\Phi_T(t)+\beta)$], where $\beta$ is based on the beamforming setting 130.

The configurable antenna circuit 96 is configured to provide four antenna assemblies to transmit the first and second outbound RF beamforming signals 106 and 108. Each of the antenna assemblies includes an antenna interface module 170, 171, 174, 175 and an antenna structure 172, 173, 176, 177. Each of the antenna structures 172, 173, 176, 177 may include one or more dipole antennas, mono pole antennas, diversity antenna pairs, planer helical antennas, meandering trace antennas, and/or any other antennas capable of transceiving RF signals. Each of the antenna interfaces 170, 171, 174, 175 may include a transformer balun, an impedance matching circuit, and/or a transmission line.

Figure 8:
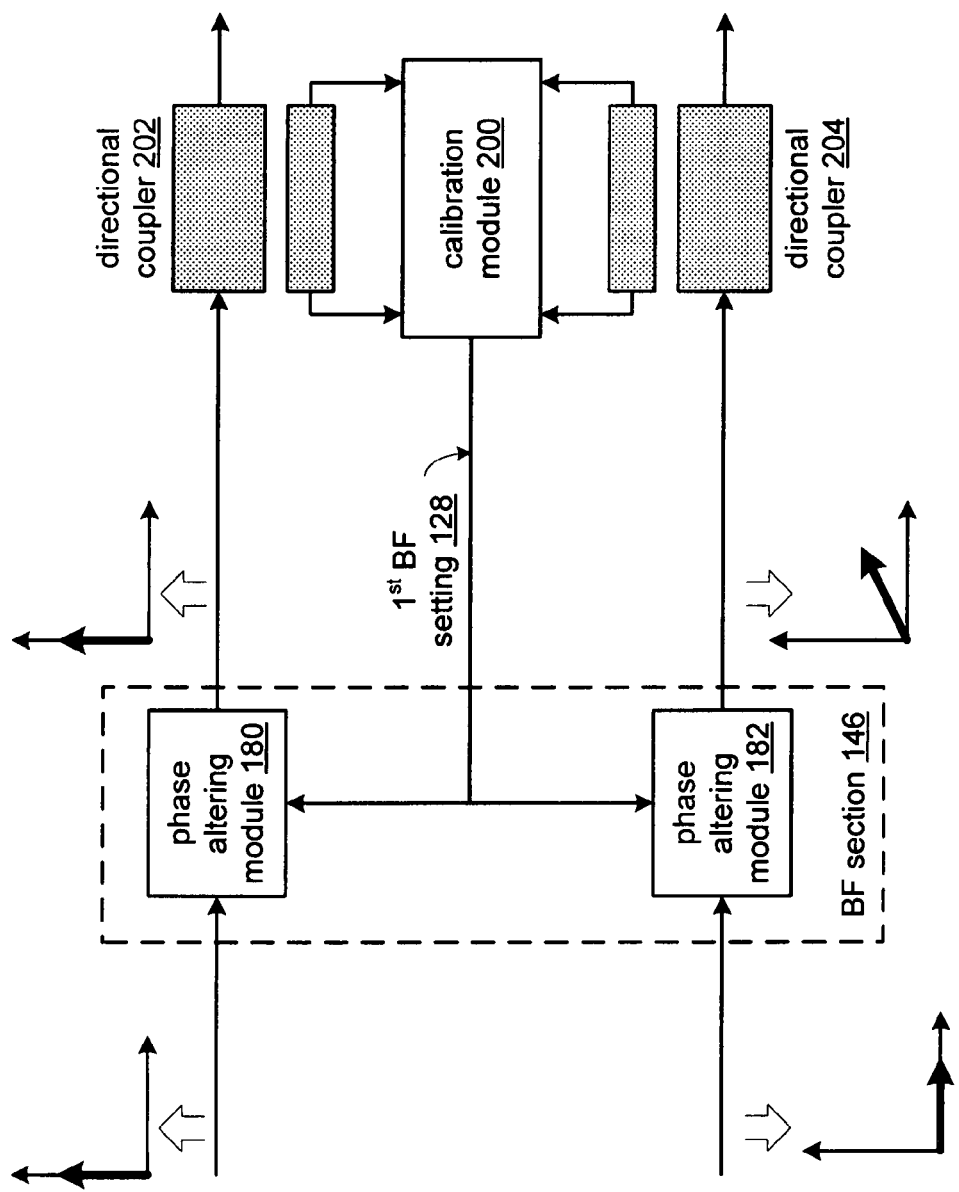
FIG. 8 is a schematic block diagram of an embodiment of a beamforming section in accordance with the present invention.

FIG. 8 is a schematic block diagram of an embodiment of a beamforming section 146 that includes the phase altering modules 180 and 182, directional couplers 202 and 204, and a calibration module 200. The calibration module 200 may be a separate processing device or may be part of the baseband processing module 90.

When the first mode is active, the first directional coupler senses one of the first outbound RF beamforming signals to produce a sensed first outbound RF beamforming signal and the second directional coupler senses another one of the first outbound RF beamforming signals to produce another sensed first outbound RF beamforming signal. The calibration module 200 adjusts the first beamforming setting 128 based on at least one of the sensed first outbound RF beamforming signal and the another sensed first outbound RF beamforming signal. For example, the sensing of the first outbound RF beamforming signals may used to determine the actual beamforming angle of each signal. If the actual beamforming angle is not substantially equal to the desired beamforming angle, the calibration module 200 adjusts the angles specified in the $1^{st}$ beamforming setting.

When the second mode is active, the first directional coupler 202 senses one of the second outbound RF beamforming signals to produce a sensed second outbound RF beamforming signal and the second directional coupler 202 senses another one of the second outbound RF beamforming signals to produce another sensed second outbound RF beamforming signal. The calibration module adjusts the second beamforming setting based on at least one of the sensed second outbound RF beamforming signal and the another sensed second outbound RF beamforming signal.

Figure 9:
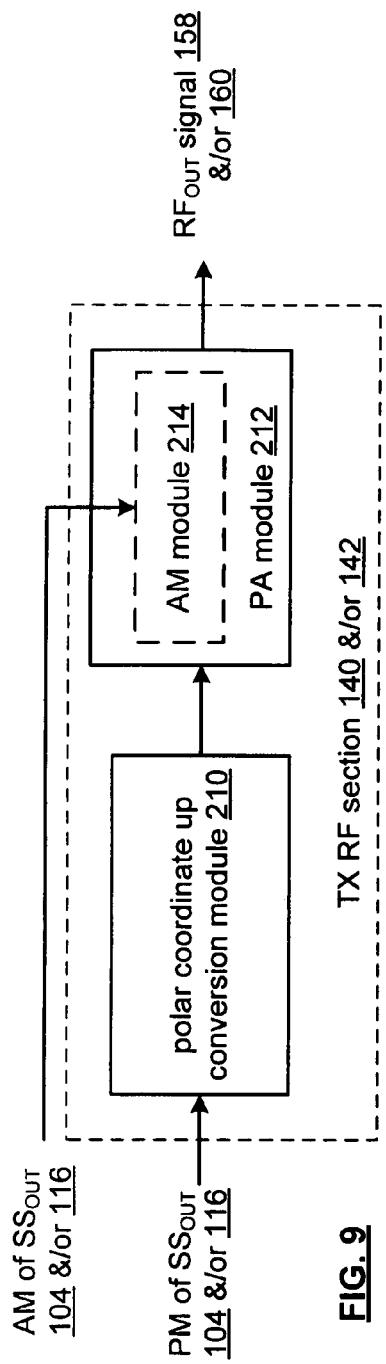
FIG. 9 is a schematic block diagram of an embodiment of a transmitter RF section in accordance with the present invention.

FIG. 9 is a schematic block diagram of an embodiment of a TX RF section 140 and/or 142 that includes a polar coordinate up conversion module 210 and a power amplifier module 212. The power amplifier module 212 may include one or more power amplifiers and/or power amplifier drivers and may further include an amplitude modulation (AM) module 214.

In this embodiment, the outbound symbol stream 104 and/or 116 includes phase modulation information (PM) and/or amplitude modulation information (AM). For example, if the baseband processing module 90 utilizes BPSK or QPKS to produce the outbound symbol stream 104 and/or 116, then the outbound symbol stream 104 and/or 116 includes only phase modulation information (i.e., the amplitude modulation information is a constant). As another example, if the baseband processing module 90 utilizes ASK to produce the outbound symbol stream 104 and/or 116, then the outbound symbol stream 104 and/or 116 includes only amplitude modulation information (i.e., the phase modulation information is a constant). As yet another example, if the baseband processing module 90 utilizes 8-PSK or QAM to produce the outbound symbol stream 104 and/or 116, then the outbound symbol stream 104 and/or 116 includes both phase modulation information and amplitude modulation information.

The polar coordinate up conversion module 210 includes an oscillation circuit to produce an output oscillation having a frequency at the desired carrier frequency of the outbound RF signal 158 and/or 160. The polar coordinate up conversion module 210 modulates the output oscillation based on the phase modulation information to produce a phase modulated RF signal. The power amplifier module 212 amplifies the phase modulated RF signal and may further amplitude modulate the phase modulated RF signal to produce the outbound RF signal 158 and/or 160.

Figure 10:
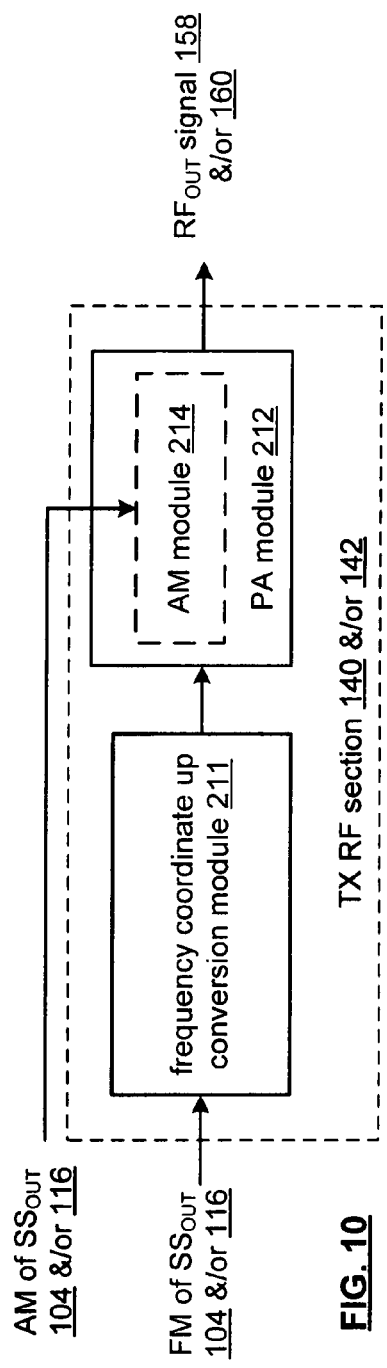
FIG. 10 is a schematic block diagram of another embodiment of a transmitter RF section in accordance with the present invention.

FIG. 10 is a schematic block diagram of another embodiment of a TX RF section 140 and/or 142 that includes a frequency coordinate up conversion module 211 and the power amplifier module 212. The power amplifier module 212 may include one or more power amplifiers and/or power amplifier drivers and may further include an amplitude modulation (AM) module 214.

In this embodiment, the outbound symbol stream 104 and/or 116 includes frequency modulation information (FM) and/or amplitude modulation information (AM). For example, if the baseband processing module 90 utilizes FSK, MSK, GMSK or GFSK to produce the outbound symbol stream 104 and/or 116, then the outbound symbol stream 104 and/or 116 includes only frequency modulation information (i.e., the amplitude modulation information is a constant). As another example, if the baseband processing module 90 utilizes ASK to produce the outbound symbol stream 104 and/or 116, then the outbound symbol stream 104 and/or 116 includes only amplitude modulation information (i.e., the phase modulation information is a constant).

The frequency coordinate up conversion module 211 includes an oscillation circuit to produce an output oscillation having a frequency at the desired carrier frequency of the outbound RF signal 158 and/or 160. The frequency coordinate up conversion module 211 modulates the output oscillation based on the frequency modulation information to produce a frequency modulated RF signal. The power amplifier module 212 amplifies the frequency modulated RF signal and may further amplitude modulate the frequency modulated RF signal to produce the outbound RF signal 158 and/or 160.

Figure 11:
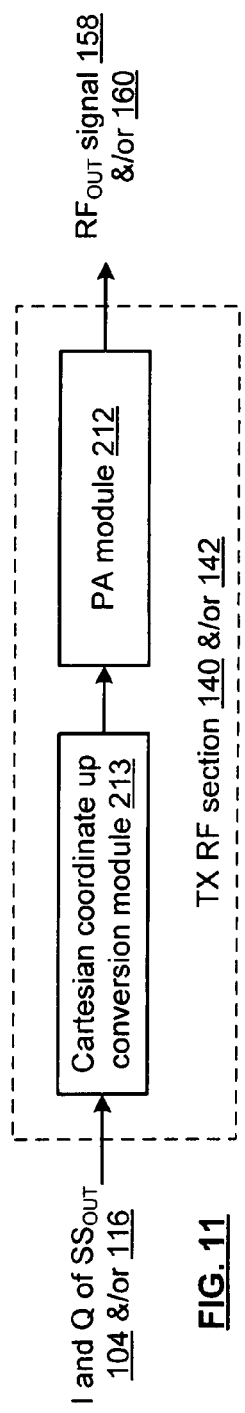
FIG. 11 is a schematic block diagram of another embodiment of a transmitter RF section in accordance with the present invention.

FIG. 11 is a schematic block diagram of another embodiment of a TX RF section 140 and/or 142 that includes a Cartesian coordinate up conversion module 213 and the power amplifier module 212. In this embodiment, the outbound symbol stream 104 and/or 116 includes an in-phase (I) signal component and a quadrature (Q) signal component. The Cartesian coordinate up conversion module 210 includes an I mixer, a Q mixer, a combining module, and filtering. The I mixer mixes the I signal component with an I local oscillation to produce a first mixed signal and the Q mixer mixes the Q signal component with a Q local oscillation to produce a second mixed signal. The combining module combines the first and second mixed signals to produce an outbound RF signal, which is subsequently filtered. The power amplifier module 212 amplifies the outbound RF signal to produce the first or second outbound RF signal 158 and/or 160.

Figure 12:
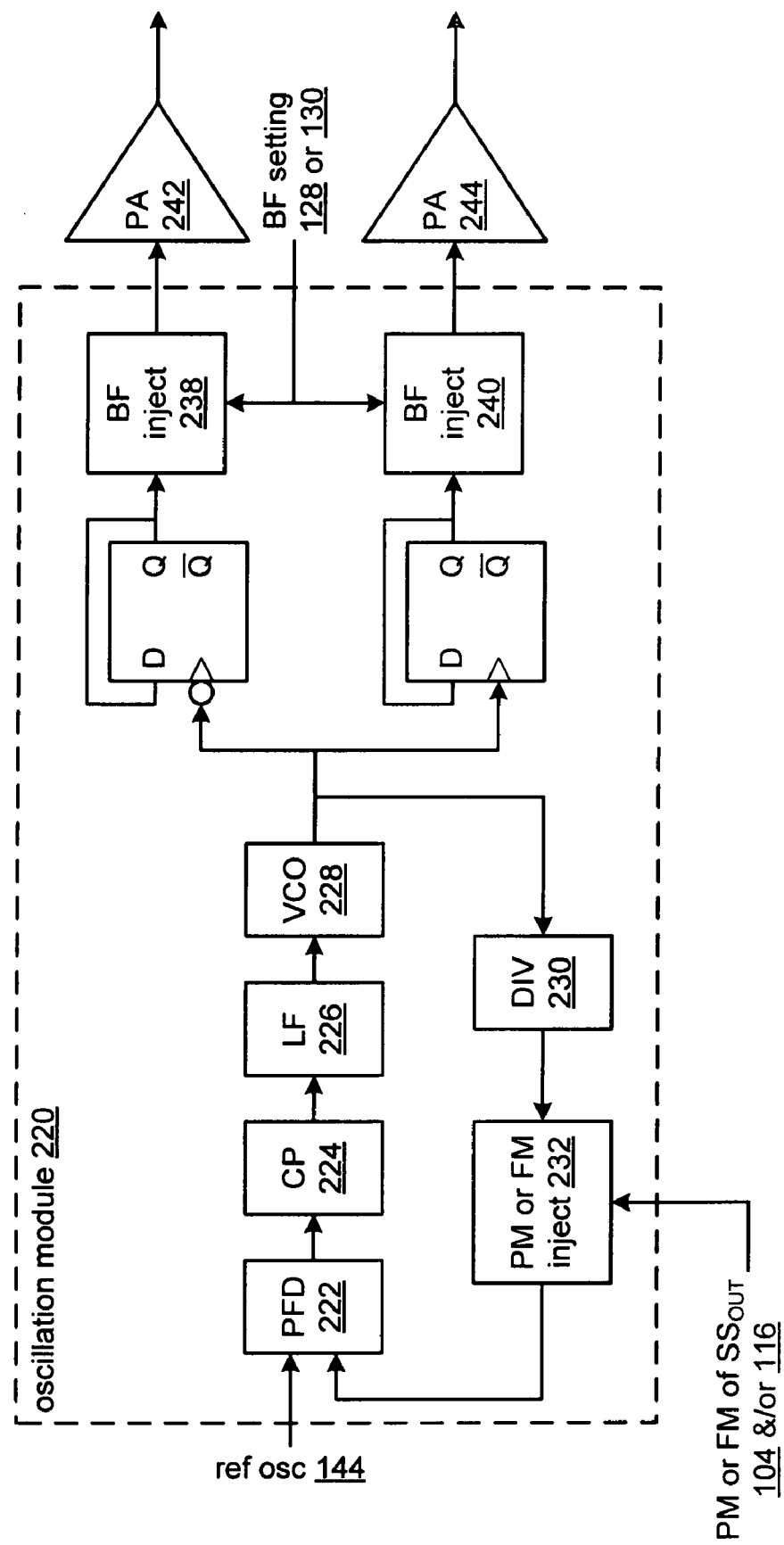
FIG. 12 is a schematic block diagram of an embodiment of transmitter section in accordance with the present invention.

FIG. 12 is a schematic block diagram of an embodiment of the transmitter section 94 that includes an oscillation module 220 and a plurality of power amplifiers (PA) 242-244. The oscillation module 220 includes a phase and/or frequency detector (PFD) 222, a charge pump (CP) 224, a loop filter (LF) 226, a voltage controlled oscillator (VCO) 228, a divider module (DIV) 230, a phase or frequency injection module 232, first and second D flip-flops, a first beamforming injection module 238, and a second beamforming injection module 240.

The phase and/or frequency detector (PFD) 222, the charge pump (CP) 224, the loop filter (LF) 226, the voltage controlled oscillator (VCO) 228, the divider module (DIV) 230, and the phase or frequency injection module 232 operate as a phase locked loop to produce a frequency modulated output oscillation or a phase modulated output oscillation. The rate of the output oscillation is twice the frequency of the outbound RF signals 158 and/or 160. Note that, in this instance, the phase modulation information and the frequency modulation information may need to be oversampled to accommodate the higher output oscillation frequency.

The D flip-flops generate two oscillations of the same rate that are out of phase by 90° (i.e., orthogonal signals). The beamforming injection modules 2238 and 240 inject a corresponding beamforming angle in accordance with the beamform setting 128 or 130 into the respective oscillations to produce beamforming RF signals. The power amplifiers 242-244 amplify the beamforming RF signals to produce the outbound RF beamforming signals 105 or 119.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling"and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A multiple mode radio frequency (RF) transmitter comprises:
   a baseband section coupled to:
      convert first outbound data into a first outbound symbol stream in accordance with a first communication protocol when the first communication protocol is enabled; and
      convert second outbound data into a second outbound symbol stream in accordance with a second communication protocol when the second communication protocol is enabled;
   a transmitter section coupled to:
      convert the first outbound symbol stream into first outbound RF beamforming signals in accordance with a first beamforming setting selected based on at least the first communication protocol; and
      convert the second outbound symbol stream into second outbound RF beamforming signals in accordance with a second beamforming setting selected based on at least the second communication protocol; and
   a configurable antenna circuit coupled to:
      provide a first antenna assembly for transmitting the first outbound RF beamforming signals; and
      provide a second antenna assembly for transmitting the second outbound RF beamforming signals.

2. The multiple mode RF transmitter of claim 1, wherein the transmitter section comprises:
   a first RF section coupled to convert the first outbound symbol stream into a first outbound RF signal;
   a second RF section coupled to convert the second outbound symbol stream into a second outbound RF signal;
   a hybrid section coupled to convert at least one of:
      the first outbound RF signal into a plurality of orthogonal first outbound RF signals; and
      the second outbound RF signal into a plurality of orthogonal second outbound RF signals;
   a beamforming section coupled to adjust at least one of:
      phase of at least one of the plurality of orthogonal first outbound RF signals in accordance with the first beamforming setting to produce the first outbound RF beamforming signals; and
      phase of at least one of the plurality of orthogonal second outbound RF signals in accordance with the second beamforming setting to produce the second outbound RF beamforming signals.

3. The multiple mode RF transmitter of claim 2, wherein the beamforming section comprises at least one of:
   a first adjustable phase altering module coupled to alter at least one of:
      the phase of a first one of the plurality of orthogonal first outbound RF signals in accordance with the first beamforming setting; and
      the phase of a first one of the plurality of orthogonal second outbound RF signals in accordance with the second beamforming setting;
   a second adjust phase alter module coupled to alter at least one of:
      the phase of a second one of the plurality of orthogonal first outbound RF signals in accordance with the first beamforming setting; and
      the phase of a second one of the plurality of orthogonal second outbound RF signals in accordance with the second beamforming setting.

4. The multiple mode RF transmitter of claim 2, wherein the beamforming section further comprises:
   a first directional coupler coupled to sense at least one of:
      one of the first outbound RF beamforming signals to produce a sensed first outbound RF beamforming signal; and
      one of the second outbound RF beamforming signals to produce a sensed second outbound RF beamforming signal;
   a second directional coupler coupled to sense at least one of:
      another one of the first outbound RF beamforming signals to produce another sensed first outbound RF beamforming signal; and
      another one of the second outbound RF beamforming signals to produce another sensed second outbound RF beamforming signal; and
   a calibration module coupled to adjust at least one of:
      the first beamforming setting based on at least one of the sensed first outbound RF beamforming signal and the another sensed first outbound RF beamforming signal; and
      the second beamforming setting based on at least one of the sensed second outbound RF beamforming signal and the another sensed second outbound RF beamforming signal.

5. The multiple mode RF transmitter of claim 2, wherein each of the first and second RF sections comprises:
   a polar coordinate up conversion module coupled to convert the outbound symbol stream into an up converted signal; or a frequency coordinate up conversion module coupled to convert the outbound symbol stream into the up converted signal; or a Cartesian coordinate up conversion module coupled to convert the outbound symbol stream into the up converted signal; and a power amplifier module coupled to amplify the up converted signal to produce a first or second outbound RF signal.

6. The multiple mode RF transmitter of claim 5, wherein the power amplifier module comprises:

an amplitude modulation module coupled to amplitude modulate the up converted signal based on amplitude information of the outbound symbol stream.

7. The multiple mode RF transmitter of claim 1, wherein the transmitter section comprises:

an oscillation module coupled to:
when the first communication protocol is enabled, generate, in accordance with the first beamforming setting, a plurality of first phase modulated and beamforming oscillations based on a first phase modulation information of the first outbound symbol stream; and
when the second communication protocol is enabled, generate, in accordance with the second beamforming setting, a plurality of second phase modulated and beamforming oscillations based on a second phase modulation information of the second outbound symbol stream; and a power amplifier module coupled to:
amplify the plurality of first phase modulated and beamforming oscillations to produce the first outbound RF beamforming signals; and
amplify the plurality of second phase modulated and beamforming oscillations to produce the second outbound RF beamforming signals.

8. The multiple mode RF transmitter of claim 1, wherein the configurable antenna circuit comprises:

a first antenna interface module;
a second antenna interface module;
a first antenna structure coupled to the first adjustable antenna interface module; and
a second antenna structure coupled to the second adjustable antenna interface module, wherein, when the first communication protocol is enabled, the first antenna interface module and the first antenna structure are configured to transmit one of the first outbound RF beamforming signals and the second antenna interface module and the second antenna structure are configured to transmit another one of the first outbound RF beamforming signals and, when the second communication protocol is enabled, the first antenna interface module and the first antenna structure are configured to transmit one of the second outbound RF beamforming signals and the second antenna interface module and the second antenna structure are configured to transmit another one of the second outbound RF beamforming signals.

9. A multiple mode radio frequency (RF) transceiver comprises:

a baseband section coupled to:
convert first outbound data into a first outbound symbol stream in accordance with a first communication protocol when the first communication protocol is enabled;
convert a first inbound symbol stream into first inbound data in accordance with the first communication protocol;
convert second outbound data into a second outbound symbol stream in accordance with a second communication protocol when the second communication protocol is enabled; and
convert a second inbound symbol stream into second inbound data in accordance with the second communication protocol;

a transmitter section coupled to:
convert the first outbound symbol stream into first outbound RF beamforming signals in accordance with a first beamforming setting selected based on at least the first communication protocol; and
convert the second outbound symbol stream into second outbound RF beamforming signals in accordance with a second beamforming setting selected based on at least the second communication protocol;

a receiver section coupled to:
convert first inbound beamformed RF signals into the first inbound symbol stream; and
convert second inbound beamformed RF signals into the second inbound symbol stream; and a configurable antenna circuit coupled to:
provide a first antenna assembly for transmitting the first outbound RF beamforming signals and for receiving the first inbound beamformed RF signals; and
provide a second antenna assembly for transmitting the second outbound RF beamforming signals and for receiving the second beamformed inbound RF signals.

10. The multiple mode RF transceiver of claim 9, wherein the receiver section comprises:

a hybrid section coupled to convert at least one of:
the first inbound beamformed RF signals into a first inbound RF signal; and
the second inbound beamformed RF signals into a second inbound RF signal;
a first low noise amplifier module coupled to amplify the first inbound RF signal to produce a first amplified inbound RF signal;
a second low noise amplifier module coupled to amplify the second inbound RF signal to produce a second amplified inbound RF signal;
a first down conversion module coupled to convert the first amplified inbound RF signal into the first inbound symbol stream; and
a second down conversion module coupled to convert the second amplified inbound RF signal into the second inbound symbol stream.

11. The multiple mode RF transceiver of claim 9, wherein the configurable antenna circuit comprises:

a first antenna interface module;
a second antenna interface module;
a first antenna structure coupled to the first adjustable antenna interface module; and
a second antenna structure coupled to the second adjustable antenna interface module, wherein, when the first communication protocol is enabled, the first antenna interface module and the first antenna structure are configured to receive the first inbound beamformed RF signals and to transmit one of the first outbound RF beamforming signals and the second antenna interface module and the second antenna structure are configured to transmit another one of the first outbound RF beamforming signals and, when the second communication protocol is enabled, the first antenna interface module and the first antenna structure are configured to receive the second inbound beamformed RF signals and to transmit one of the second outbound RF beamforming signals and the second antenna interface module and the second antenna structure are configured to transmit another one of the second outbound RF beamforming signals.

12. The multiple mode RF transceiver of claim 9, wherein the transmitter section comprises:
   a first RF section coupled to convert the first outbound symbol stream into a first outbound RF signal;
   a second RF section coupled to convert the second outbound symbol stream into a second outbound RF signal;
   a hybrid section coupled to convert at least one of:
      the first outbound RF signal into a plurality of orthogonal first outbound RF signals; and
      the second outbound RF signal into a plurality of orthogonal second outbound RF signals;
   a beamforming section coupled to adjust at least one of:
      phase of at least one of the plurality of orthogonal first outbound RF signals in accordance with the first beamforming setting to produce the first outbound RF beamforming signals; and
      phase of at least one of the plurality of orthogonal second outbound RF signals in accordance with the second beamforming setting to produce the second outbound RF beamforming signals.

13. The multiple mode RF transceiver of claim 12, wherein the beamforming section comprises at least one of:
   a first adjustable phase altering module coupled to alter at least one of:
      the phase of a first one of the plurality of orthogonal first outbound RF signals in accordance with the first beamforming setting; and
      the phase of a first one of the plurality of orthogonal second outbound RF signals in accordance with the second beamforming setting;
   a second adjust phase alter module coupled to alter at least one of:
      the phase of a second one of the plurality of orthogonal first outbound RF signals in accordance with the first beamforming setting; and
      the phase of a second one of the plurality of orthogonal second outbound RF signals in accordance with the second beamforming setting.

14. The multiple mode RF transceiver of claim 12, wherein the beamforming section further comprises:
   a first directional coupler coupled to sense at least one of:
      one of the first outbound RF beamforming signals to produce a sensed first outbound RF beamforming signal; and
      one of the second outbound RF beamforming signals to produce a sensed second outbound RF beamforming signal;
   a second directional coupler coupled to sense at least one of:
      another one of the first outbound RF beamforming signals to produce another sensed first outbound RF beamforming signal; and
      another one of the second outbound RF beamforming signals to produce another sensed second outbound RF beamforming signal; and
   a calibration module coupled to adjust at least one of:
      the first beamforming setting based on at least one of the sensed first outbound RF beamforming signal and the another sensed first outbound RF beamforming signal; and
      the second beamforming setting based on at least one of the sensed second outbound RF beamforming signal and the another sensed second outbound RF beamforming signal.

15. The multiple mode RF transceiver of claim 12, wherein each of the first and second RF sections comprises:
   a polar coordinate up conversion module coupled to convert the outbound symbol stream into an up converted signal; or
   a frequency coordinate up conversion module coupled to convert the outbound symbol stream into the up converted signal; or
   a Cartesian coordinate up conversion module coupled to convert the outbound symbol stream into the up converted signal; and
   a power amplifier module coupled to amplify the up converted signal to produce a first or second outbound RF signal.

16. The multiple mode RF transceiver of claim 15, wherein the power amplifier module comprises:
   an amplitude modulation module coupled to amplitude modulate the up converted signal based on amplitude information of the outbound symbol stream.

17. The multiple mode RF transceiver of claim 9, wherein the transmitter section comprises:
   an oscillation module coupled to:
      when the first communication protocol is enabled, generate, in accordance with the first beamforming setting, a plurality of first phase modulated and beamforming oscillations based on a first phase modulation information of the first outbound symbol stream; and
      when the second communication protocol is enabled, generate, in accordance with the second beamforming setting, a plurality of second phase modulated and beamforming oscillations based on a second phase modulation information of the second outbound symbol stream; and
   a power amplifier module coupled to:
      amplify the plurality of first phase modulated and beamforming oscillations to produce the first outbound RF beamforming signals; and
      amplify the plurality of second phase modulated and beamforming oscillations to produce the second outbound RF beamforming signals.

* * * * *

UNITED STATES PATENT AND TRADEMARK OFFICE
CERTIFICATE OF CORRECTION

PATENT NO. : 8,260,360 B2  
APPLICATION NO. : 11/821382  
DATED : September 4, 2012  
INVENTOR(S) : Ahmadreza Rofougaran et al.

Page 1 of 1

It is certified that error appears in the above-identified patent and that said Letters Patent is hereby corrected as shown below:

Title Page, Item (74): Replace "Holy L. Rudnick" with --Holly L. Rudnick--

Signed and Sealed this  
Sixth Day of August, 2013

Teresa Stanek Rea  
*Acting Director of the United States Patent and Trademark Office*